United States Patent
Xiao et al.

(10) Patent No.: US 10,638,362 B2
(45) Date of Patent: Apr. 28, 2020

(54) METHOD AND SYSTEM FOR GROUP COMMUNICATION, GROUP SERVER, AND GROUP MEMBER DEVICE

(71) Applicant: HUAWEI TECHNOLOGIES CO., LTD., Shenzhen, Guangdong (CN)

(72) Inventors: Fangying Xiao, Shenzhen (CN); Yongjing Zhang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 71 days.

(21) Appl. No.: 15/876,562

(22) Filed: Jan. 22, 2018

(65) Prior Publication Data
US 2018/0199234 A1   Jul. 12, 2018

Related U.S. Application Data

(63) Continuation of application No. 14/494,138, filed on Sep. 23, 2014, now Pat. No. 9,924,409, which is a
(Continued)

(51) Int. Cl.
*H04L 12/58* (2006.01)
*H04W 8/18* (2009.01)
(Continued)

(52) U.S. Cl.
CPC ............ *H04W 28/06* (2013.01); *H04L 47/22* (2013.01); *H04L 51/14* (2013.01);
(Continued)

(58) Field of Classification Search
CPC ......... H04W 28/06; H04W 4/70; H04W 4/08; H04W 4/12; H04W 4/18; H04W 8/186;
(Continued)

(56) References Cited

U.S. PATENT DOCUMENTS

| 2003/0217142 A1 | 11/2003 | Bobde et al. |
| 2005/0228895 A1 | 10/2005 | Karunamurthy et al. |

(Continued)

FOREIGN PATENT DOCUMENTS

| CN | 101677327 A | 3/2010 |
| CN | 101742477 A | 6/2010 |

(Continued)

OTHER PUBLICATIONS

ETSI, Machine-to-Machine Communications (M2M); mIa, dIa and mId interfaces, ETSI TS 102 921 V1.1.1, Feb. 2012, 538 pages.*

(Continued)

*Primary Examiner* — Mohamed A Kamara
(74) *Attorney, Agent, or Firm* — Fish & Richardson P.C.

(57) ABSTRACT

Embodiments of the present invention provide a group communication method, system, group server, and group member device. A group server receives notification messages sent by a group member device, aggregates, according to an address of a subscription device, the notification messages destined for the same subscription device, and sends a notification message obtained after aggregation to the subscription device. By aggregating multiple messages sent by the group member device to the subscription device, messages exchanged between the group member device and the subscription device are reduced, thereby reducing communication traffic between the group member device and the subscription device.

14 Claims, 12 Drawing Sheets

Related U.S. Application Data continuation of application No. PCT/CN2012/075427, filed on May 14, 2012.

(51) Int. Cl.

| | | |
|---|---|---|
| *H04W 28/06* | (2009.01) | |
| *H04W 4/08* | (2009.01) | |
| *H04L 29/08* | (2006.01) | |
| *H04W 4/18* | (2009.01) | |
| *H04W 4/70* | (2018.01) | |
| *H04W 4/12* | (2009.01) | |
| *H04L 12/815* | (2013.01) | |

(52) U.S. Cl.
CPC ........... *H04L 67/2838* (2013.01); *H04W 4/08* (2013.01); *H04W 4/12* (2013.01); *H04W 4/18* (2013.01); *H04W 4/70* (2018.02); *H04L 67/26* (2013.01); *H04W 8/186* (2013.01)

(58) Field of Classification Search
CPC ..... H04L 51/14; H04L 67/2838; H04L 47/22; H04L 67/26
See application file for complete search history.

(56) References Cited

U.S. PATENT DOCUMENTS

| | | | |
|---|---|---|---|
| 2006/0168319 A1* | 7/2006 | Trossen | H04L 67/24 709/238 |
| 2006/0274701 A1 | 12/2006 | Albertsson | |
| 2007/0211682 A1 | 9/2007 | Kim et al. | |
| 2008/0195535 A1 | 8/2008 | Liu | |
| 2008/0208990 A1 | 8/2008 | Andreasson et al. | |
| 2009/0037573 A1 | 2/2009 | Qiu et al. | |
| 2010/0099389 A1 | 4/2010 | Zhu et al. | |
| 2010/0250677 A1 | 9/2010 | Kahan et al. | |
| 2010/0318544 A1* | 12/2010 | Nicolov | G06Q 30/0202 707/759 |
| 2011/0128911 A1* | 6/2011 | Shaheen | H04L 63/104 370/328 |
| 2012/0218965 A1 | 8/2012 | Chen | |
| 2012/0220326 A1 | 8/2012 | Li et al. | |

FOREIGN PATENT DOCUMENTS

| | | |
|---|---|---|
| CN | 102014144 A | 4/2011 |
| CN | 102056140 A | 5/2011 |
| KR | 20050108533 A | 11/2005 |
| KR | 20080032114 A | 4/2008 |
| WO | 2007002434 A2 | 1/2007 |
| WO | 2011054142 A1 | 5/2011 |
| WO | 2011062841 A1 | 5/2011 |

OTHER PUBLICATIONS

XP002734233 Devlic A :"SIP-based Context Distribution:Does Aggregation Pay Off?",Oct. 31, 2010,total 12 pages.

XP002734234 "Group manegement",In:"Draft ETSI TS 102 690 V 0.9.1 Machine-to-Machine communications(M2M); Functional architecture",Dec. 1, 2010,total 8 pages.

XP031373740 Ana Hristova et al:"Developing an Ambient Home Care System :Context Toolkit-Based Design and Implementation",Dec. 1, 2008,total 7 pages.

InterDigital Communications, LLC, "MTC devices acting as a gateway", 3GPP TSG-SA WG1 Meeting #50 S1-101057, dated May 10-14, 2010,total 2 pages.

ETSI, Machine-to-Machine communications (M2M); mla, dla and mid interfaces, ETSI TS 102 921 V1. 1. 1, dated Feb. 2012, total 538 pages.

A. B .Roach et al.,"A Session Initiation Protocol (SIP) Event Notification Extension for Resource Lists", Estacado Systems et al.,dated Aug. 2006,total 39 pages.

ETSI TS 102 690 V1.1.1 (Oct. 2011),Machine-to-Machine communications (M2M);Functional architecture,ETSI Technical Specification,dated Oct. 2011,total 280 pages.

ETSI TS 102 921 V2.0.1 (Apr. 2012),Machine-to-Machine communications (M2M);mla, dla and mid interfaces,ETSI Technical Specification,dated Apr. 2012,total 20 pages.

J. Rosenberg et al.,"SIP: Session Initiation Protocol",dated Jun. 2002,total 240 pages.

Office Action issued in Chinese Application No. 201611104036.X dated Jul. 22, 2019, 13 pages (with English translation).

Communication Pursuant to Article 94(3) EPC issued in European Application No. 18151112.2 dated Dec. 10, 2019, 6 pages.

Hiller, "XDM Subscription Proxy Reuse," Open Mobile Alliance (OMA); Doc# OMA-MWG-CAB-2009-0163R01-CR_XDM_Subscription_Proxy_reuse.doc; Change Request to MWG-CAB; XP064141547 , Jun. 9, 2009, 5 pages.

\* cited by examiner

METHOD AND SYSTEM FOR GROUP COMMUNICATION, GROUP SERVER, AND GROUP MEMBER DEVICE

CROSS-REFERENCE TO RELATED APPLICATIONS

This application is a continuation of U.S. patent application Ser. No. 14/494,138, filed on Sep. 23, 2014, now allowed, which is a continuation of International Application No. PCT/CN2012/075427, filed on May 14, 2012. All of the aforementioned patent applications are hereby incorporated by reference in their entireties.

TECHNICAL FIELD

The present invention relates to the field of communication technology, and in particular, to a method and a system for group communication, a group server, and a group member device.

BACKGROUND

With the development of communication technology, Machine-to-Machine Communication (M2M) is widely applied. The M2M communication is a network-based application and service centering on intelligent machine interaction. By embedding a wireless or wired communication module and application logic module, the M2M communication implements data communication without manual intervention, so as to meet information requirements of users for monitoring, scheduling, data collection, measurement, and so on.

FIG. 1 shows a typical M2M system architecture. The system architecture includes M2M terminals, an M2M gateway, an M2M service platform, and an M2M application.

An M2M terminal, such as a sensor and a microcontroller, is configured to receive a service instruction sent by the M2M application, and perform a service operation according to the received service instruction; the M2M gateway, as a proxy server between the M2M terminal and a transport network, is configured to provide a proxy service for an M2M terminal connected to the gateway; the M2M service platform is configured to provide a shared M2M function for the M2M application; the M2M application, such as power meter reading or intelligent transportation, is configured to use a service capability, provided by the M2M service platform, to acquire data collected by the M2M terminal or perform remote control and management on the M2M terminal.

In the M2M system, an M2M terminal accesses the M2M service platform directly, or remotely through the M2M gateway. By using the service capability provided by the M2M service platform, various M2M applications acquire data collected by the M2M terminal or perform remote control and management on the M2M terminal.

In the M2M system, a group communication capability is particularly important. Currently, the M2M technical specification (TS) 102 690 and TS 102 921 formulated by the European Telecommunications Standards Institute (ETSI) describe a resource-oriented group communication method. In this method, resources such as an M2M application, an M2M service platform, an M2M terminal, and an M2M gateway, including all local applications and data objects running on the M2M terminal and M2M gateway, are all considered as a kind of Representational State Transfer (RESTful) group resource. The RESTful group resource is uniquely identified by a Universal Resource Identifier (URI). A group-based operation can be performed on multiple resources by including the preceding resources as a member of the group resource. That is, the M2M application can operate the group resource at a time through a subscription device, to obtain information of group member resources on all group member devices, thereby reducing the communication payload.

However, the preceding method is only suitable for a subscription device to send an operation request to group member devices. When the group member devices send notification messages to the subscription device, too many messages are exchanged between the group member device and the subscription devices, which results in heavy communication traffic.

SUMMARY

Embodiments of the present invention provide a group communication method, system, group server, and group member device, for solving a problem of heavy communication traffic caused by too many messages exchanged between a group member device and a subscription device when the group member device sends notification messages to the subscription device.

An embodiment of the present invention provides a group communication method, including: receiving notification messages sent by a group member device, where the notification messages are sent to a group server after a resource of the group member device meets a subscription condition set by a subscription device, and the number of notification messages is two at least; aggregating, according to an address of the subscription device, the notification messages destined for the same subscription device; and sending, according to the address of the subscription device, a notification message obtained after aggregation to the subscription device.

An embodiment of the present invention further provides a group communication method, including: determining, by a group member device, whether a resource of the group member device meets a set subscription condition; and sending, by the group member device, notification messages to a group server if the resource of the group member device meets the set subscription condition, so that the group server aggregates the notification messages and sends a notification message obtained after aggregation to a subscription device.

An embodiment of the present invention further provides a group server, including: a first receiving module, configured to receive notification messages sent by a group member device, where the notification messages are sent to the group server after a resource of the group member device meets a subscription condition set by a subscription device, and the number of notification messages is two at least; an aggregating module, configured to aggregate, according to an address of the subscription device, the notification messages destined for the same subscription device; and a first sending module, configured to send, according to the address of the subscription device, a notification message obtained after aggregation to the subscription device.

An embodiment of the present invention further provides a group member device, including: a determining module, configured to determine whether a resource of the group member device meets a set subscription condition; and a second sending module, configured to send notification messages to a group server if the resource of the group member device meets the set subscription condition, so that the group server aggregates the notification messages and sends a notification message obtained after aggregation to a subscription device.

An embodiment of the present invention further provides a group communication system, including: a group member device, configured to send notification messages to a group server, where the notification messages are sent to the group server after a resource of the group member device meets a subscription condition set by a subscription device, and the number of notification messages is two at least; and the group server, configured to receive the notification messages sent by the group member device, aggregate, according to an address of the subscription device, the notification messages destined for the same subscription device, and send, according to the address of the subscription device, a notification message obtained after aggregation to the subscription device.

In the embodiments of the present invention, a group server receives the notification messages sent by a group member device, aggregates, according to an address of a subscription device, notification messages destined for the same subscription device, and sends a notification message obtained after aggregation to the subscription device. By aggregating multiple messages sent by the group member device to the subscription device, messages exchanged between the group member device and the subscription device are reduced, thereby reducing communication traffic between the group member device and the subscription device.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art according to the embodiments of the present invention without creative efforts shall fall within the protection scope of the present invention.

The following describes the overall technical solution of method embodiments of the present invention.

Method Embodiment 1

Figure 1:
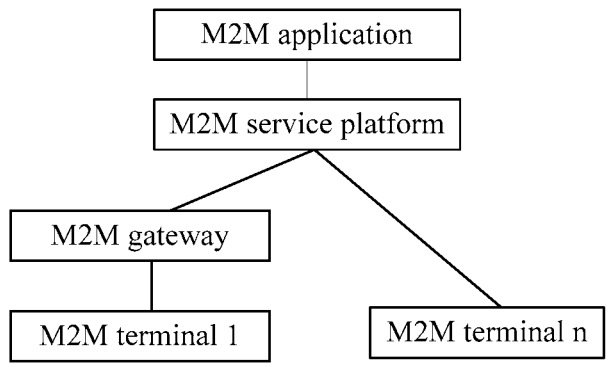
FIG. 1 is a schematic diagram of an M2M system architecture in the prior art.
Figure 2:
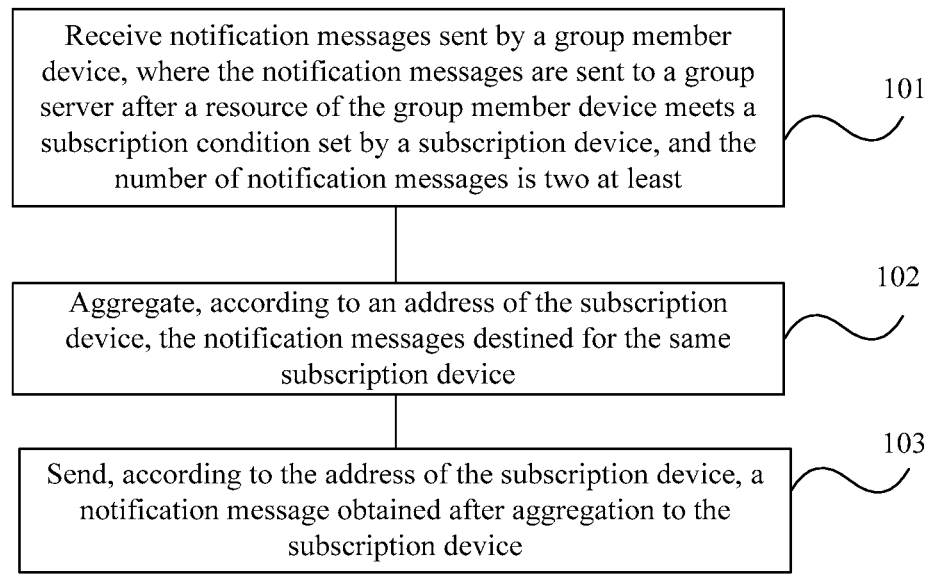
FIG. 2 is a schematic flowchart of an embodiment of a group communication method according to the present invention.

FIG. 2 is a schematic flowchart of an embodiment of a group communication method according to the present invention. As shown in FIG. 2, the method includes:

Step 101: Receive notification messages sent by a group member device, where the notification messages are sent to a group server after a resource of the group member device meets a subscription condition set by a subscription device, and the number of notification messages is two at least.

In this embodiment of the present invention, the group server is a server that can perform a group-based operation on multiple resources. For example, in an M2M system, resources such as an M2M application, an M2M service platform, an M2M terminal, and an M2M gateway, including all local applications and data objects running on the M2M terminal and the M2M gateway, are all considered as a kind of RESTful group resource. The group server can perform a group-based operation on the resources. The group member device is a device where a group resource resides, such as a humidity sensor or a temperature sensor.

It should be noted that in this embodiment of the present invention, the group server may be deployed and run on the M2M service platform, the M2M terminal, or the M2M gateway.

Step 102: Aggregate, according to an address of the subscription device, the notification messages destined for the same subscription device.

Step 103: Send, according to the address of the subscription device, a notification message obtained after aggregation to the subscription device.

In this embodiment of the present invention, the group server can aggregate multiple notification messages according to the address of the subscription device. The number of notification messages obtained after aggregation is smaller than the number of notification messages sent by the group member device. Alternatively, the number of notification messages obtained after aggregation is 1.

In this embodiment of the present invention, a group server receives notification messages sent by a group member device, aggregates, according to an address of a subscription device, the notification messages destined for the same subscription device, and sends a notification message obtained after aggregation to the subscription device. By aggregating multiple messages sent by a group member device to the subscription device, messages exchanged between the group member device and the subscription device are reduced, thereby reducing communication traffic between the group member device and the subscription device.

Method Embodiment 2

Figure 3:
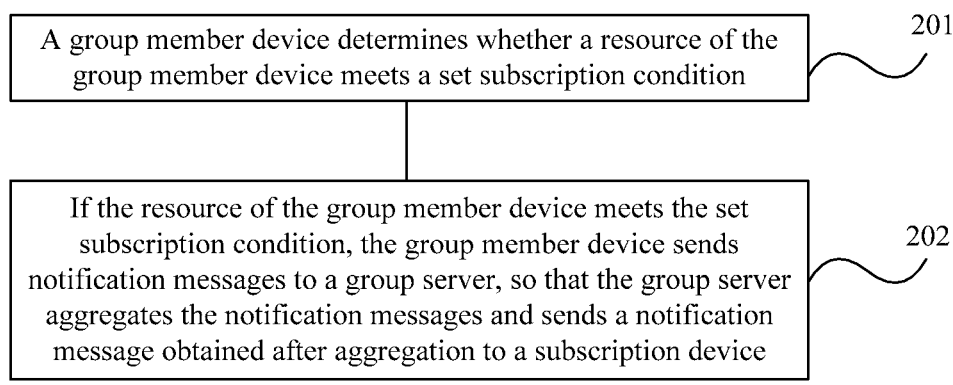
FIG. 3 is a schematic flowchart of another embodiment of a group communication method according to the present invention.

FIG. 3 is a schematic flowchart of another embodiment of a group communication method according to the present invention. As shown in FIG. 3, the method includes:

Step 201: A group member device determines whether a resource of the group member device meets a set subscription condition.

Step 202: If the resource of the group member device meets the set subscription condition, the group member device sends notification messages to a group server, so that the group server aggregates the notification messages and sends a notification message obtained after aggregation to a subscription device.

In this embodiment of the present invention, the group server is a server that can perform a group-based operation on multiple resources. For example, in an M2M system, resources such as an M2M application, an M2M service platform, an M2M terminal, and an M2M gateway, including all local applications and data objects running on the M2M terminals and the M2M gateway, are all considered as a kind of RESTful group resource. The group server can perform a group-based operation on the resources. The group member device is a device where a group resource resides, such as a humidity sensor or a temperature sensor.

It should be noted that in this embodiment of the present invention, the group server may be deployed and run on the M2M service platform, the M2M terminal, or the M2M gateway.

In addition, it should further be noted that in this embodiment of the present invention, the number of notification messages obtained after aggregation by the group server is smaller than the number of notification messages sent by the group member device. Alternatively, the number of notification messages obtained after aggregation by the group server is 1.

In this embodiment of the present invention, after a resource of a group member device meets a set subscription condition, the group member device sends notification messages to a group server, so that the group server aggregates the notification messages and sends a notification message obtained after aggregation to the subscription device. By aggregating multiple messages sent by the group member device to the subscription device, messages exchanged between the group member device and the subscription device are reduced, thereby reducing communication traffic between the group member device and the subscription device.

Method Embodiment 3

Figure 4:
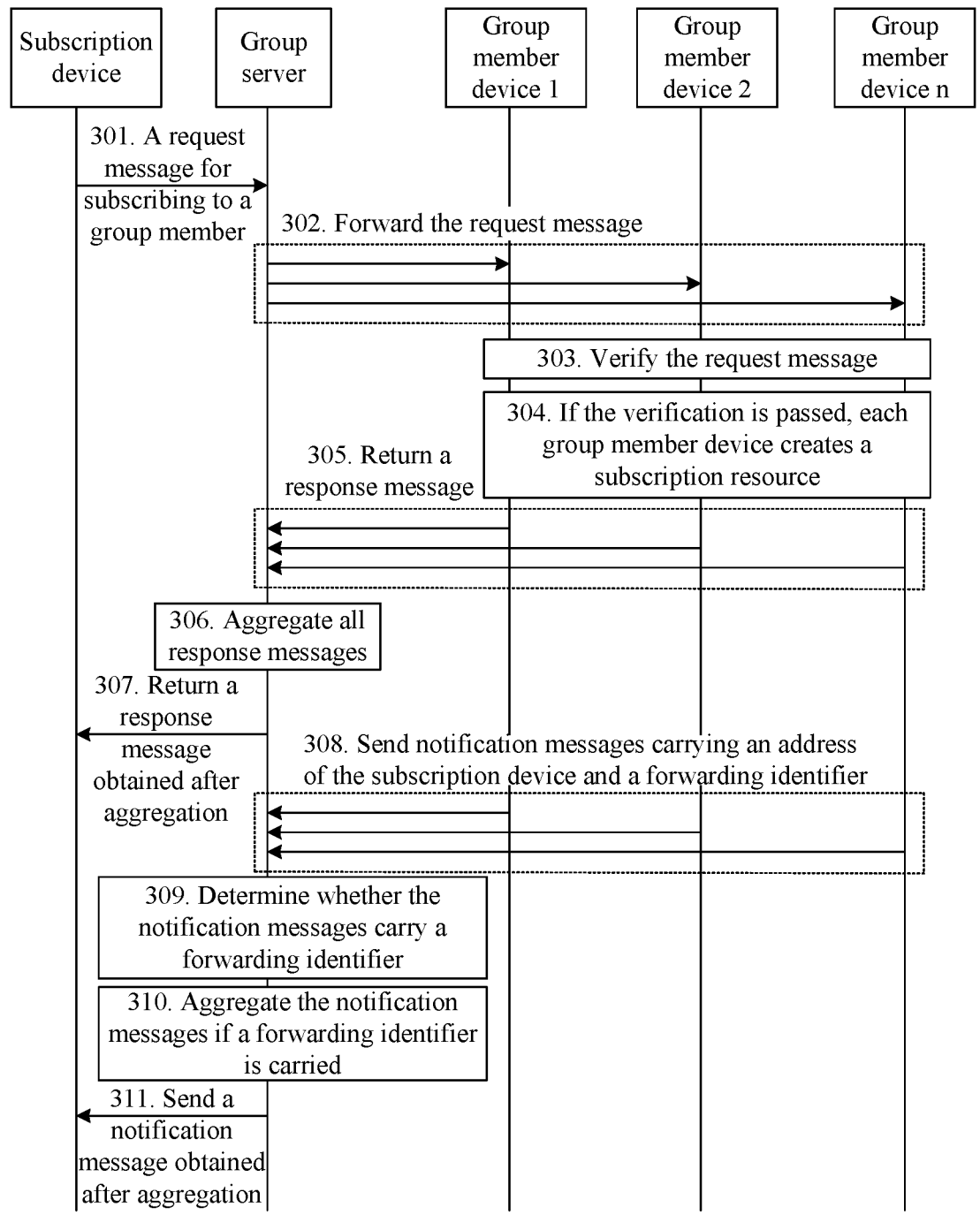
FIG. 4 is a schematic flowchart of another embodiment of a group communication method according to the present invention.

FIG. 4 is a schematic flowchart of another embodiment of a group communication method according to the present invention. In this embodiment of the present invention, a subscription device and a group member resource are not at the same service capability layer (SCL). The solution of the present invention is described with an example where a subscription device carries a forwarding identifier and an address of the subscription device in notification messages sent to a group server and the group server aggregates and sends the notification messages to the subscription device. As shown in FIG. 4, the method includes:

Step 301: A subscription device sends a request message for subscribing to a group member resource to a group server, where the request message carries an address of the subscription device.

In this embodiment of the present invention, the subscription device is a device that sends a service request message to the group server. The subscription device may be any electronic product that can perform human-machine interaction with a user through a keyboard, a mouse, a remote control, a touchpad, or a voice-operated device, including but not limited to a computer, a mobile phone, and the like.

Step 302: The group server forwards the request message for subscribing to a group member resource to each group member device, where the request message carries an address of the group server and the address of the subscription device.

In this embodiment of the present invention, the address of the group server is used to prompt a group member device that: if a resource change of the group member device meets a subscription condition preset by the subscription device, a notification message needs to be sent to the group server.

For example, if the group member device is a temperature sensor, the subscription condition set by the subscription device is that: when a temperature sensed by the temperature sensing apparatus reaches 100° C., reporting is needed. When the temperature sensed by the temperature sensing apparatus reaches 100° C., the temperature sensing apparatus encapsulates a temperature parameter into a notification message, and sends the notification message to the group server according to the address of the group server.

It should be noted that in this embodiment of the present invention, an implementation manner of the address of the group server is not limited. For example, a URI may be used to represent the address of the group server.

Step 303: Each group member device verifies the request message according to the address of the subscription device carried in the request message.

In this embodiment of the present invention, the group member device verifies the request message according to the address of the subscription device carried in the request message, in order to identify whether the subscription device has service subscription permission for the group member device.

Step 304: If the verification is passed, each group member device creates a subscription resource and stores the address of the group server and the address of the subscription device carried in the request message.

In this embodiment of the present invention, that the group member device creates a subscription resource means that: The group member device creates, in its subresource, the subscription resource, and sets attributes of the subscription resource, where the attributes of the subscription resource include but are not limited to: creation time of the subscription resource, expiry time of the subscription resource, last modification time of the subscription resource, subscription condition of the subscription resource, recipient address of a notification message of the subscription resource, and the like.

It should be noted that in this embodiment of the present invention, when creating the subscription resource, the group member device sets a recipient address of a notification message of the subscription resource to the address of the group server.

It should further be noted that if the subscription device is at the same service capability layer (SCL) as the group member resource, the group member device sets the recipient address of the notification message of the subscription resource to the address of the subscription device when creating the subscription resource, so that when the resource change of the group member device meets the subscription condition set by the subscription device, the notification message is directly sent to the subscription device according to the address of the notification message. It can be determined, according to an identifier of the subscription device and an identifier of the group member resource, whether the subscription device and the group member resource are at the same service capability layer. The identifier may be a URI.

Step 305: Each group member device returns a response message to the group server.

Step 306: The group server aggregates all response messages.

Step 307: The group server returns a response message obtained after aggregation to the subscription device.

Step 308: When a resource of a group member device meets the subscription condition set by the subscription device, the group member device sends a notification message to the group server according to the recipient address of the notification message, where the notification message carries the address of the subscription device and a forwarding identifier.

In this embodiment of the present invention, the forwarding identifier is used to trigger the group server to aggregate notification messages sent by group member devices, and forward a notification message obtained after aggregation to the subscription device according to the address of the subscription device.

Step 309: The group server determines whether the notification message carries the forwarding identifier.

Step 310: If the notification message carries the forwarding identifier, the group server aggregates, according to the address of the subscription device carried in the notification message, notification messages destined for the same subscription device.

Specifically, the group server determines, according to the forwarding identifier carried in the notification messages, that the notification messages need to be forwarded to the subscription device. The group server aggregates, according to the address of the subscription device receiving the notification messages which is carried in the notification messages, the notification messages that carry the same address of the subscription device into a single notification message.

For example, subscription device A subscribes to group member device 1, group member device 2, and group member device 3. If the subscription condition set by the subscription device is met within a set time period, group member device 1, group member device 2, and group member device 3 send notification messages to the group server. The notification messages all carry an address of subscription device A. After receiving the notification messages, the group server aggregates, according to the address of subscription device A carried in the notification messages, the notification messages that carry the same address of subscription device A into a single notification message.

Step 311: The group server sends, according to the address of the subscription device, a notification message obtained after aggregation to the subscription device.

In this embodiment of the present invention, by carrying a forwarding identifier and an address of a subscription device in notification messages sent by group member devices, a group server can aggregate the notification messages sent by the group member devices to the same subscription device and send a message obtained after aggregation to the subscription device. This reduces the number of notification messages between the subscription device and the group member devices, thereby reducing communication traffic.

On the basis of this embodiment of the present invention, the following may be further included: The group server receives a group resource update request, where the group resource update request is used to change the status of the group resource, for example, to change access permission for the group resource. The group server forwards the group resource update request to each group member device. Each group member device determines whether the update request is forwarded by the group server. If the group resource update request is forwarded by the group server, after the updated group resource meets the subscription condition set by the subscription device, notification messages are aggregated by the group server and a notification message obtained after aggregation is sent to the subscription device. Otherwise, the group member devices directly send the notification messages to the subscription device, thereby preventing the group server from aggregating all updated group resources and reducing the resource overhead of the group server.

The group member device determines whether the update request is forwarded by the same group server. A specific manner may be as follows: When forwarding a group resource update request to the group member device, the group server carries an address of the group server in the request. The group member device compares a stored address of the group server for aggregating notification messages with the address of the group server carried in the resource update request. If the address of the group server that is used for aggregating notification messages and is stored on the group member device is the same as the address of the group server carried in the resource update request, it can be determined that the update request is forwarded by a group server used for aggregating notification messages.

Method Embodiment 4

Figure 5:
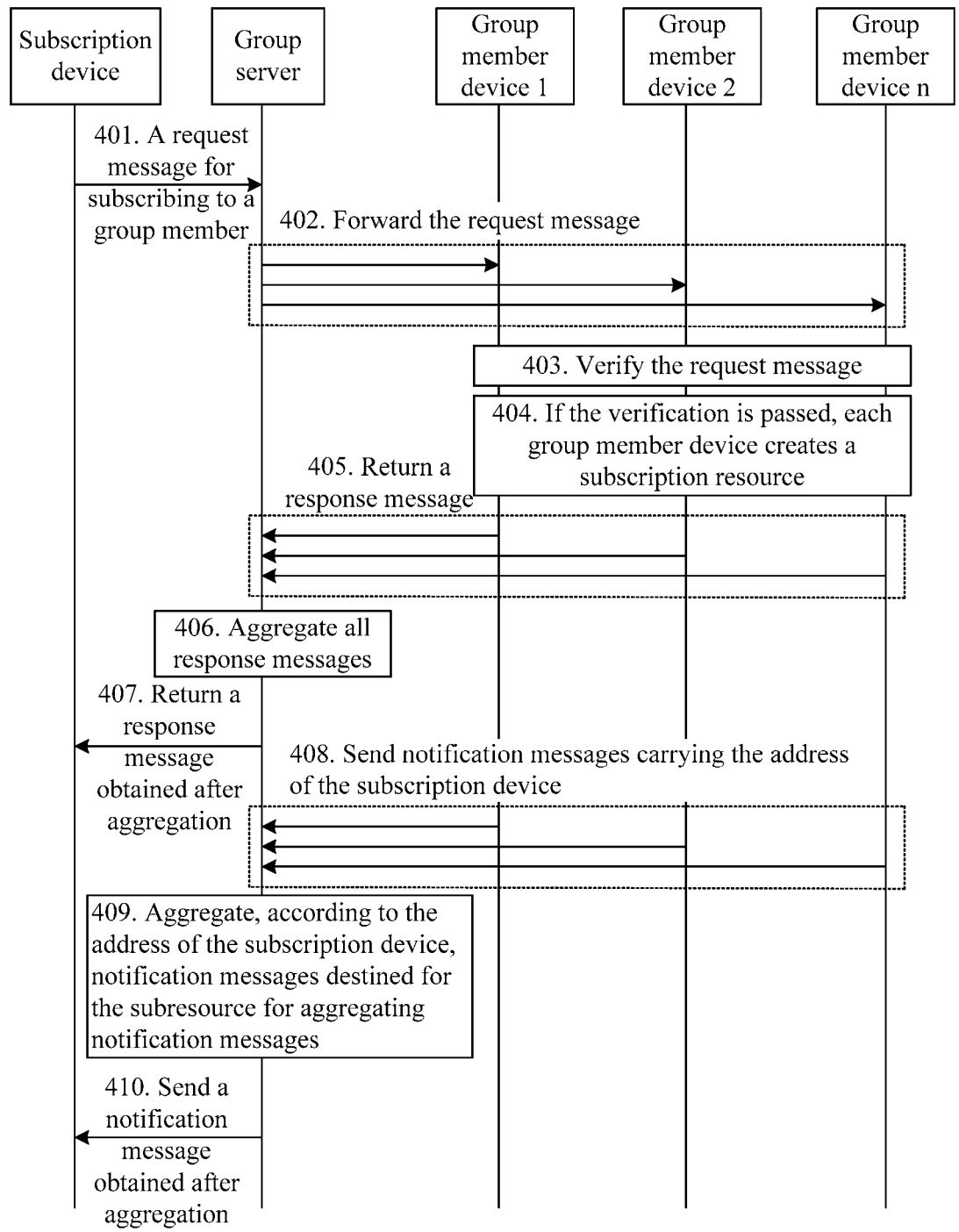
FIG. 5 is a schematic flowchart of another embodiment of a group communication method according to the present invention.

FIG. 5 is a schematic flowchart of another embodiment of a group communication method according to the present invention. In this embodiment of the present invention, a subscription device and a group member resource are not at the same SCL. The solution of the present invention is described with an example, where in a group resource <group> defined in the European Telecommunications Standards Institute (ETSI) M2M TS 102 690, a subresource for aggregating notification messages is introduced to aggregate notification messages sent to the subscription device and send a message obtained after aggregation to the subscription device. As shown in FIG. 5, the method includes:

Step 401: A subscription device sends a request message for subscribing to a group member resource to a group server, where the request message carries an address of the subscription device.

In this embodiment of the present invention, the subscription device is a device that sends a service request message to the group server. The subscription device may be any electronic product that can perform human-machine interaction with a user through a keyboard, a mouse, a remote control, a touchpad, or a voice-operated device, including but not limited to a computer, a mobile phone, and the like.

Step 402: The group server forwards the request message for subscribing to a group member resource to each group member device, where the request message carries an address of a subresource of the group server for aggregating notification messages and the address of the subscription device.

In this embodiment of the present invention, the address of the subresource of the group server for aggregating notification messages is used to prompt a group member device that: if a resource change of the group member device meets a subscription condition set by the subscription device, the notification messages need to be sent to the subresource of the group server according to the address of the subresource of the group server for aggregating notification messages.

Specifically, a subresource for aggregating notification messages is introduced in the group resource <group> defined in the ETSI M2M TS 102 690, where, actually the subresource is not used for storing a resource. When a destination of the notification messages sent by the group member device to the group server is the subresource for aggregating notification messages, the group server aggregates the notification messages according to the address of the subscription device and forwards a message obtained after aggregation to the subscription device.

Figure 13:
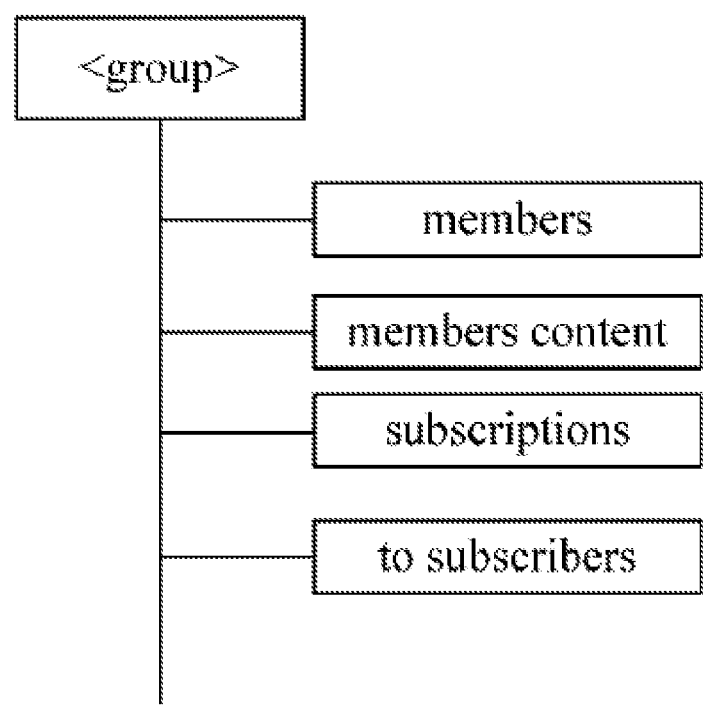
FIG. 13 shows a Table 1.

As shown in Table 1 (FIG. 13), "to subscribers" indicates the subresource introduced in the group resource <group> for aggregating notification messages.

The <group> is a group resource representation defined in the ETSI M2M TS 102 690. The <group> mainly includes: a members attribute, members, used for describing the URI of each member resource; a members content subresource, members content, used for indicating all group member resources; a subscription subresource, subscriptions, used for storing information such as a subscriber that subscribes to a group resource.

It should be noted that in this embodiment of the present invention, the members attribute can be added, deleted, modified, or viewed for implementing modification or viewing of a group member list. The members content subresource can be added, deleted, modified, or viewed for implementing modification or viewing of all member resources of a group. The subscriptions subresource can be added, deleted, modified, or viewed for implementing prompt perception of a change of a group resource in time.

It should further be noted that in this embodiment of the present invention, if the subresource that is introduced in <group> and used for aggregating notification messages, is to subscribers shown in Table 1, in step 402, the address of the subresource of the group server that is carried in the request message and used for aggregating notification messages may be: URI of group/to Subscribers.

Step 403: Each group member device verifies the request message according to the address of the subscription device carried in the request message.

In this embodiment of the present invention, the group member device verifies the request message according to the address of the subscription device carried in the request message, in order to identify whether the subscription device has service subscription permission for the group member device.

Step 404: If the verification is passed, each group member device creates a subscription resource and stores the address of the subresource of the group server for aggregating notification messages and the address of the subscription device carried in the request message.

In this embodiment of the present invention, that the group member device creates a subscription resource means that: The group member device creates, in its subresource, the subscription resource, and sets attributes of the subscription resource, where the attributes of the subscription resource include but are not limited to: creation time of the subscription resource, expiry time of the subscription resource, last modification time of the subscription resource, subscription condition of the subscription resource, recipient address of a notification message of the subscription resource, and the like.

It should be noted that in this embodiment of the present invention, when creating the subscription resource, the group member device sets a recipient address of a notification message of the subscription resource to the address of the subresource of the group server for aggregating notification messages.

It should further be noted that if the subscription device and the group member resource are at the same SCL, when creating the subscription resource, the group member device sets the recipient address of the notification message of the subscription resource to the address of the subscription device, so that when the resource change of the group member device meets the subscription condition set by the subscription device, the notification message is directly sent to the subscription device according to the address of the notification message. It can be determined, according to an identifier of the subscription device and an identifier of the group member resource, whether the subscription device and the group member resource are at the same service capability layer. The identifier may be a URI.

Step 405: The group member device returns a response message to the group server.

Step 406: The group server aggregates all response messages.

Step 407: The group server returns a response message obtained after aggregation to the subscription device.

Step 408: When a resource of the group member device meets the subscription condition set by the subscription device, the group member device sends, according to the recipient address of the notification message, the notification message to the subresource of the group server for aggregating notification messages, where the notification message carries the address of the subscription device.

Step 409: The group server aggregates, according to the address of the subscription device, all notification messages destined for the subresource of the group server for aggregating notification messages.

Specifically, the group server determines, according to the recipient address of the notification messages, that the notification messages need to be forwarded to the subscription device. The group server aggregates, according to the address of the subscription device carried in the notification messages, the notification messages that carry the same address of the subscription device into a single notification message.

Step 410: The group server sends, according to the address of the subscription device, a notification message obtained after aggregation to the subscription device.

In this embodiment of the present invention, a group member device sends notification messages to an address of a subresource of a group server for aggregating notification messages, so that the group server aggregates all notification messages sent by the group member device to the same subscription device and sends a notification message obtained after aggregation to the subscription device. This reduces the number of notification messages between the subscription device and the group member device, thereby reducing communication traffic.

Method Embodiment 5

Figure 6:
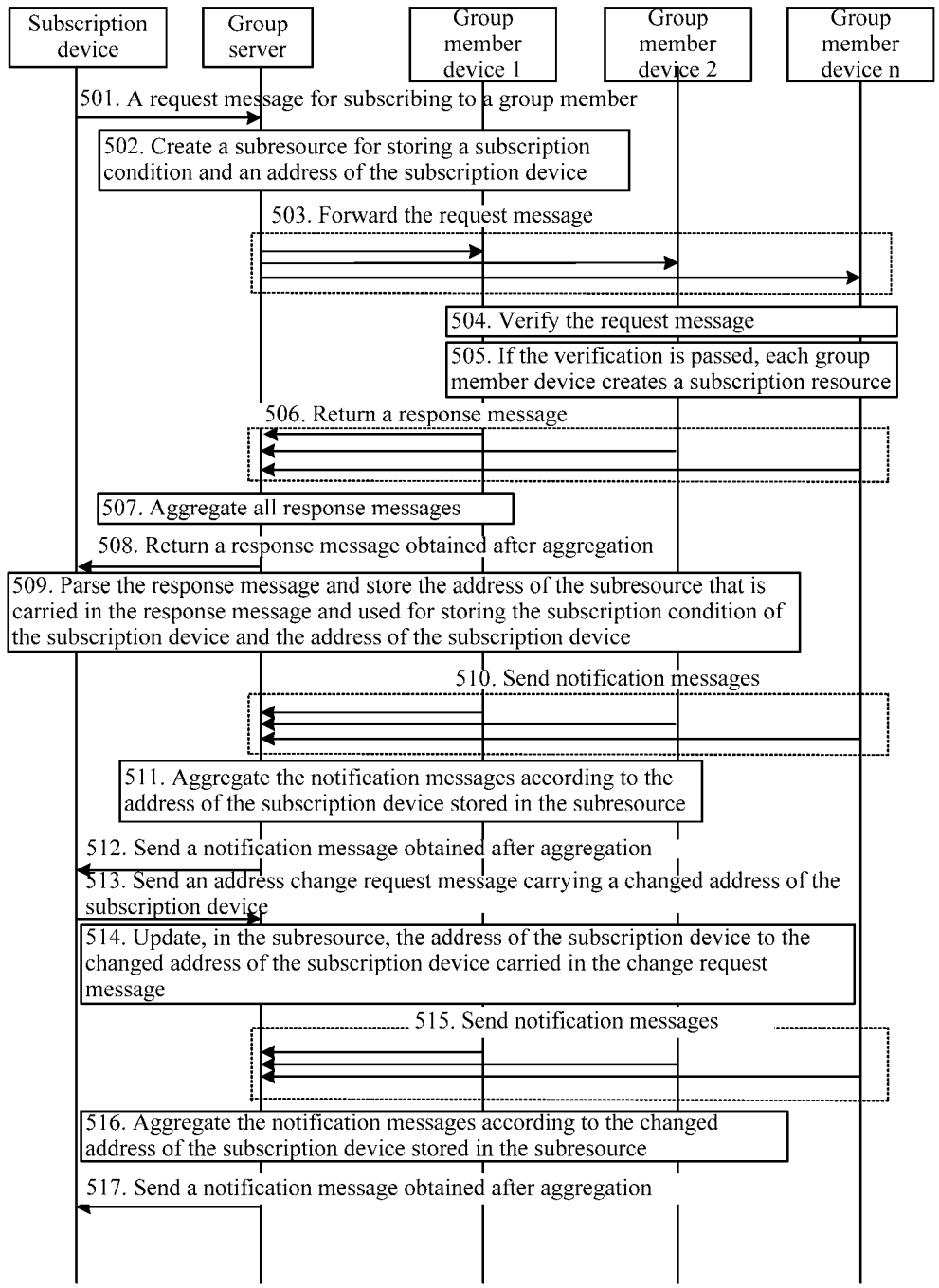
FIG. 6 is a schematic flowchart of another embodiment of a group communication method according to the present invention.

FIG. 6 is a schematic flowchart of another embodiment of a group communication method according to the present invention. In this embodiment of the present invention, a subscription device and a group member resource are not at the same SCL. A group server stores an address of a subscription device, so that when the address of the subscription device changes, a group member device does not need to be notified, and only the group server needs to be notified. Then the group server aggregates notification messages and sends a notification message obtained after aggregation to the subscription device with the changed address.

It should be noted that in this embodiment of the present invention, the RESTful resource representation mechanism is used to implement the solution of the present invention. As shown in FIG. 6, the method includes:

Step 501: A subscription device sends a request message for subscribing to a group member resource to a group server. The request message carries an address of the subscription device.

Step 502: After receiving the request message for subscribing to a group member resource, the group server creates a subresource for storing a subscription condition and the address of the subscription device.

In this embodiment of the present invention, after receiving the request message for subscribing to a group member resource, the group server creates a subresource for storing the subscription condition and the address of the subscription device, in either of the following manners:

Manner 1: after receiving the request message for subscribing to a group member resource, searching, by the group server, in a group resource, for a subresource that includes the subscription condition set by the subscription device; and if the subresource exists, creating, in the subresource, a subresource for storing the address of the subscription device; or if the subresource does not exist, first creating, according to the subscription condition set by the subscription device, a subresource for storing the subscription condition, and then creating, in the subresource for storing the subscription condition, a subresource for storing the address of the subscription device.

It should be noted that, in manner 1, the used manner of creating a subresource for storing the address of the subscription device is implemented by using the RESTful resource representation mechanism as a part of the group resource.

Figure 14:
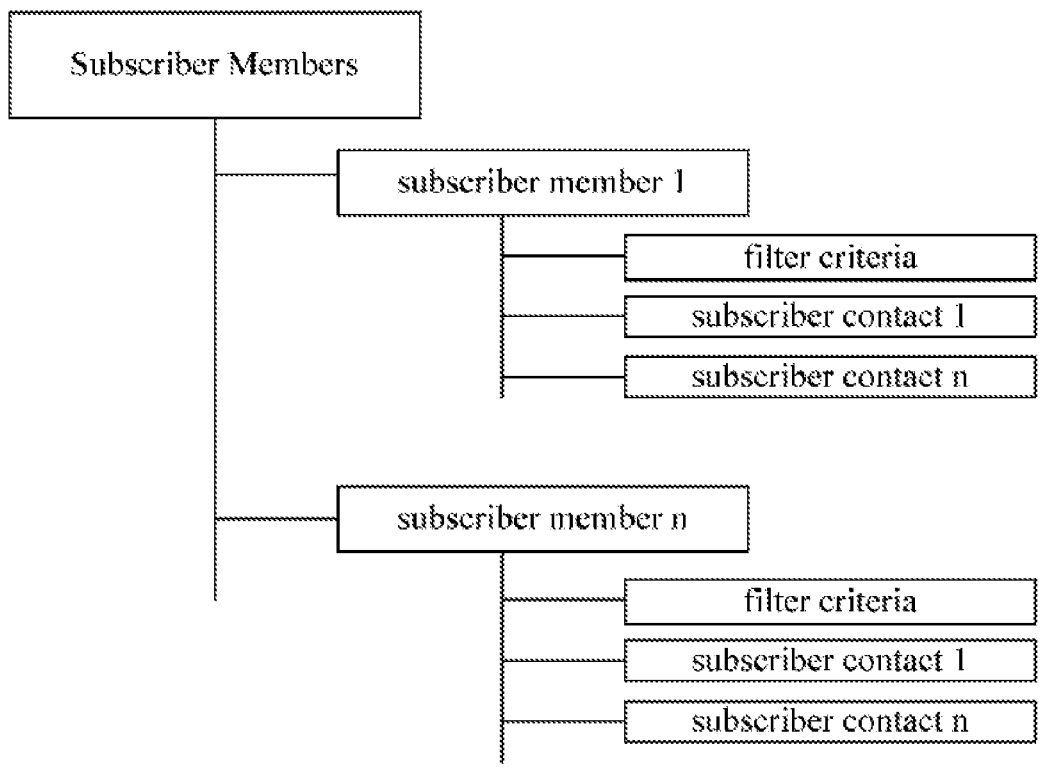
FIG. 14 shows a Table 2.

Specifically, the <Subscriber Members> subresource is introduced in the group resource <group> defined in the ETSI M2M TS 102 690 to describe related information of the subscription condition and all subscribers that subscribe to a group member resource through the group server. The <Subscriber Members> subresource is as shown in Table 2 (FIG. 14).

The <Subscriber Members> subresource includes multiple <subscriber member> subresources, and each <subscriber member> subresource includes the addresses of all subscription devices with the same subscription condition. The <subscriber member> subresource includes the following attributes:

a filter criteria attribute, used for storing a subscription condition that is set during the subscription to a group member resource; and a subscriber contact attribute, used for storing the addresses of subscription devices that have the same subscription condition as that stored in the filter criteria attribute.

Manner 2: searching for a group resource for storing subscription information of the subscription device, and if the group resource exists, searching, in the group resource, for a subresource that includes the subscription condition set by the subscription device, and if the subresource exists, creating, in the subresource, a subresource for storing the address of the subscription device, or if the subresource does not exist, first creating, according to the subscription condition set by the subscription device, a subresource for storing the subscription condition, and then creating, in the subresource for storing the subscription condition, a subresource for storing the address of the subscription device; or if the group resource for storing the subscription information of the subscription device does not exist, creating a group resource for storing the subscription information of the subscription device, and creating, in the group resource according to the subscription condition set by the subscription device, a subresource for storing the subscription condition, and creating, in the subresource for storing the subscription condition, a subresource for storing the address of the subscription device; or if the group for storing the subscription information does not exist, creating a new group, and first creating, according to the subscription condition, a subresource for storing the subscription condition, and then creating, in the new subresource, a subresource for storing the address of the subscription device.

Figure 15:
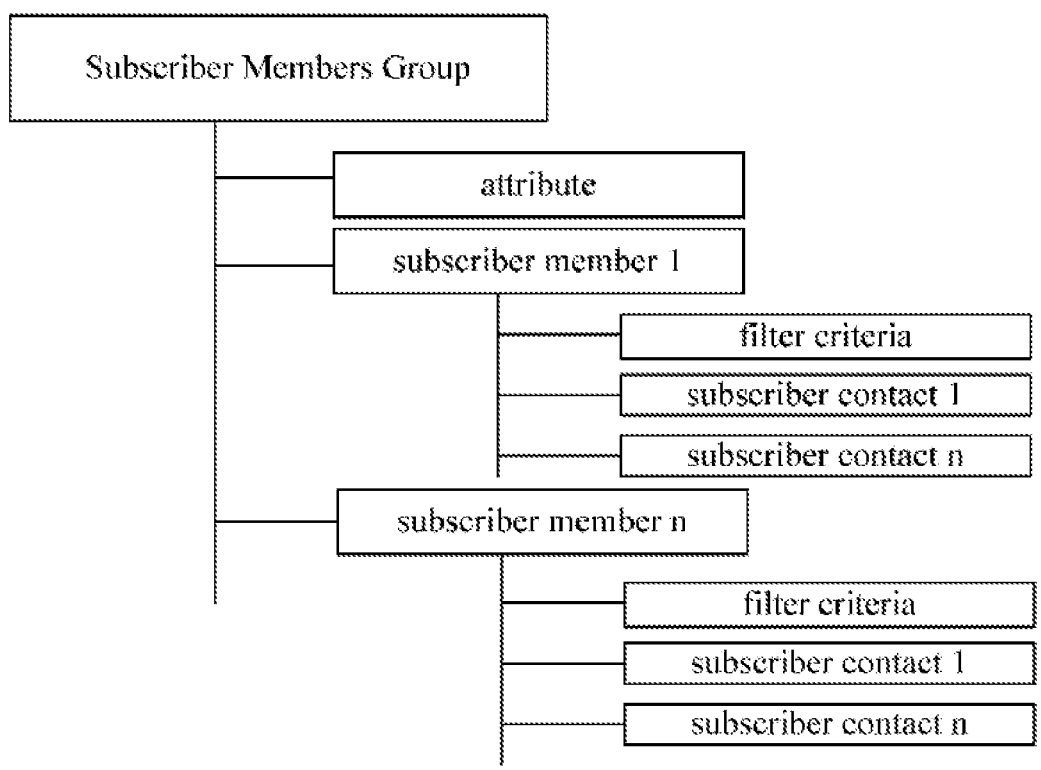
FIG. 15 shows a Table 3

It should be noted that, if a group resource for storing the subscription information of the subscription device is created, a subresource created in the new group resource is as shown in Table 3 (FIG. 15).

Step 503: The group server forwards the request message for subscribing to a group member resource to each group member device, where the request message carries the address of the subresource of the group server for aggregating notification messages and the address of the subscription device.

In this embodiment of the present invention, the address of the subresource of the group server for aggregating notification messages is used to prompt a group member device that: if a resource change of the group member device meets the subscription condition set by the subscription device, notification messages need to be sent to the subresource of the group server according to the address of the subresource of the group server for aggregating notification messages.

It should be noted that in this embodiment of the present invention, the subresource corresponding to the address of the subresource of the group server for aggregating notification messages, is used for storing the subscription condition and the address of the subscription device.

In addition, it should further be noted that, the address of the subresource of the group server for aggregating notification messages varies according to the manner of creating the subresource by the group server.

For example, if the group server creates, according to manner 1 in step 502, a subresource for storing the address of the subscription device, an address of the group server for aggregating notification messages is an address of an existing group as:

/subscribeMembers/subscribeMember/subscriberContact.

If the group server creates, according to manner 2 in step 502, a new group of the subresource for storing the address of the subscription device, the address of the group server for aggregating notification messages is an address of a new group as:

/subscribeMembers/subscribeMember/subscriberContact.

It should be noted that, the address of an existing group or a new group may be represented by using a URI.

Step 504: The group member device verifies the request message according to the address of the subscription device carried in the request message.

In this embodiment of the present invention, the group member device verifies the request message according to the address of the subscription device carried in the request message, in order to identify whether the subscription device has service subscription permission for the group member device.

Step 505: If the verification is passed, each group member device creates a subscription resource and stores the address of the group server for aggregating notification messages which is carried in the request message.

In this embodiment of the present invention, that the group member device creates a subscription resource means that: The group member device creates, in its subresource, the subscription resource, and sets attributes of the subscription resource, where the attributes of the subscription resource include but are not limited to: creation time of the subscription resource, expiry time of the subscription resource, last modification time of the subscription resource, subscription condition of the subscription resource, recipient address of a notification message of the subscription resource, and the like.

It should be noted that in this embodiment of the present invention, the group member device sets the recipient address of the notification message of the subscription resource to the address of the subresource of the group server for aggregating notification messages, that is, the address of the subresource that is set by the group server and used for storing the subscription condition of the subscription device and the address of the subscription device.

Step 506: Each group member device returns a response message to the group server.

Step 507: After receiving response messages, the group server aggregates all response messages.

Step 508: The group server returns a response message obtained after aggregation to the subscription device, where the response message carries the address of the subresource that is created by the group server and used for storing the subscription condition of the subscription device and the address of the subscription device.

Step 509: After receiving the response message, the subscription device parses the response message and stores the address of the subresource that is carried in the response message and used for storing the subscription condition of the subscription device and the address of the subscription device, for example, an address of an existing group as:

/subscribeMembers/subscribeMember/subscriberContact.

Step 510: When the resource of the group member device changes and meets the subscription condition set by the subscription device, notification messages are sent to the address of the subresource of the group server for aggregating notification messages.

Step 511: The group server aggregates, according to the address of the subscription device stored in the subresource, all notification messages destined for the address of the subresource of the group server for aggregating notification messages.

Specifically, the group server determines, according to the recipient address of the notification messages, that the notification messages need to be forwarded to the subscription device. That is, the group server determines, according to the address of the subresource of the group server for aggregating notification messages, that the notification messages need to be forwarded to the subscription device. The group server acquires, according to the recipient address of the notification messages, from the subresource of the group server corresponding to the recipient address of the notification messages, the address of the subscription device stored in the subresource. The group server aggregates, according to the address of the subscription device, the notification messages with the same recipient address into a single notification message.

Step 512: The group server sends, according to the address of the subscription device stored by the group server, a notification message obtained after aggregation to the subscription device.

Step 513: When the subscription device needs to change an address for receiving notification messages, the subscription device sends an address change request message to the group server according to the address of the subresource that is stored on the subscription device and used for storing the subscription condition of the subscription device and the address of the subscription device, where the address change request message carries a changed address of the subscription device.

Step 514: The group server updates, in the subresource for storing the subscription condition of the subscription device and the address of the subscription device, the address of the subscription device to the changed address of the subscription device carried in the change request message.

Step 515: When the resource of the group member device changes and meets the subscription condition set by the subscription device, notification messages are sent to the address of the subresource of the group server for aggregating notification messages.

Step 516: The group server aggregates, according to the changed address of the subscription device stored in the subresource of the group server, all notification messages destined for the address of the subresource of the group server for aggregating notification messages.

Step 517: The group server sends, according to the changed address of the subscription device, a notification message obtained after aggregation to the corresponding subscription device.

In this embodiment of the present invention, a group server stores an address of a subscription device. When the address of the subscription device changes, the subscription device does not need to notify a group member device, and only needs to notify the group server of changing the stored address of the subscription device, and then notification messages sent by the group member device are sent to the subscription device with the new address, thereby reducing communication traffic between the group member device and the subscription device.

Method Embodiment 6

Figure 7:
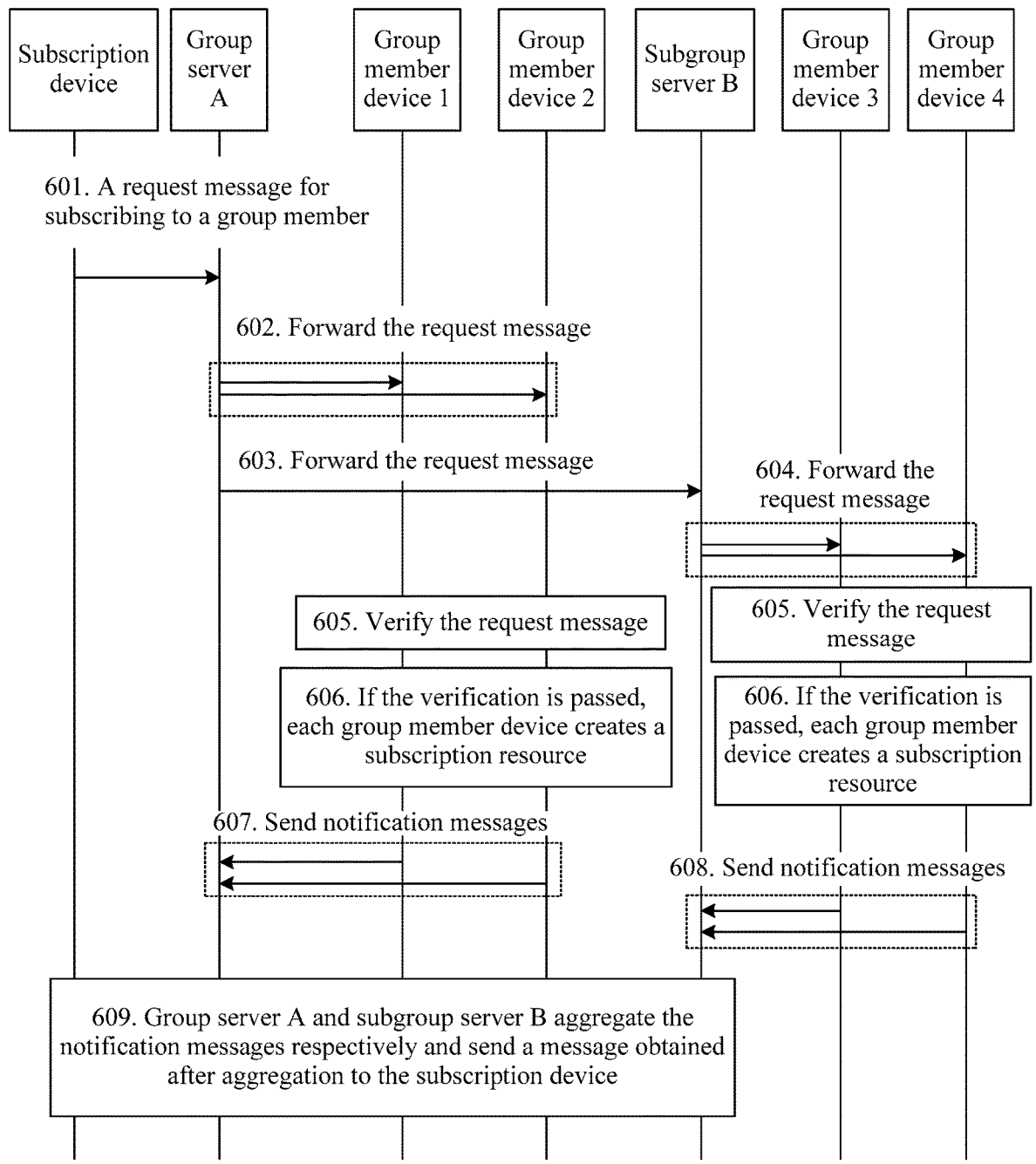
FIG. 7 is a schematic flowchart of another embodiment of a group communication method according to the present invention.

FIG. 7 is a schematic flowchart of another embodiment of a group communication method according to the present invention. In this embodiment of the present invention, a subscription device and a group member resource are not at the same SCL. The solution of the present invention is described with an example where a group includes a subgroup. In this embodiment of the present invention, group A includes subgroup B, group member device 1, and group member device 2, and subgroup B includes group member device 3 and group member device 4. As shown in FIG. 7, the method includes:

Step 601: A subscription device sends a request message for subscribing to a group member resource to group server A, where the request message carries an address of the subscription device.

Step 602: Group server A forwards the request message for subscribing to a group member resource to each group member device that belongs to group server A, where the request message carries an address of group server A for aggregating notification messages and the address of the subscription device.

Step 603: Group server A forwards the request message sent by the subscription device for subscribing to a group member resource to subgroup server B.

Step 604: Subgroup server B forwards the request message for subscribing to a group member resource to each group member device that belongs to subgroup server B, where the request message carries an address of subgroup server B for aggregating notification messages and the address of the subscription device.

Step 605: Each group member device verifies the request message according to the address of the subscription device carried in the request message.

Step 606: If the verification is passed, each group member device creates a subscription resource and stores an address of the corresponding group server for aggregating notification messages and the address of the subscription device.

In this embodiment of the present invention, group member device 1 and group member device 2 store the address of group server A for aggregating notification messages and the address of the subscription device, where the addresses are carried in the request message by group server A; group member device 3 and group member device 4 store the address of subgroup server B for aggregating notification messages and the address of the subscription device, where the addresses are carried in the request message by subgroup server B.

Step 607: When resources of group member device 1 and group member device 2 of group server A meet a subscription condition set by the subscription device, group member device 1 and group member device 2 send notification messages to the address of group server A for aggregating notification messages, where the notification messages carry the address of the subscription device.

Step 608: When resources of group member device 3 and group member device 4 of subgroup server B meet the subscription condition set by the subscription device, group member device 3 and group member device 4 send notification messages to the address of subgroup server B for aggregating notification messages, where the notification messages carry the address of the subscription device.

Step 609: Group server A and subgroup server B respectively aggregate the notification messages and send a notification message obtained after aggregation to the subscription device.

In this embodiment of the present invention, group server A and subgroup server B aggregate notification messages sent by their group member devices to the same subscription device, and send a notification message obtained after aggregation to the subscription device. This reduces the number of notification messages between the subscription device and the group member devices, thereby reducing communication traffic.

Method Embodiment 7

Figure 8:
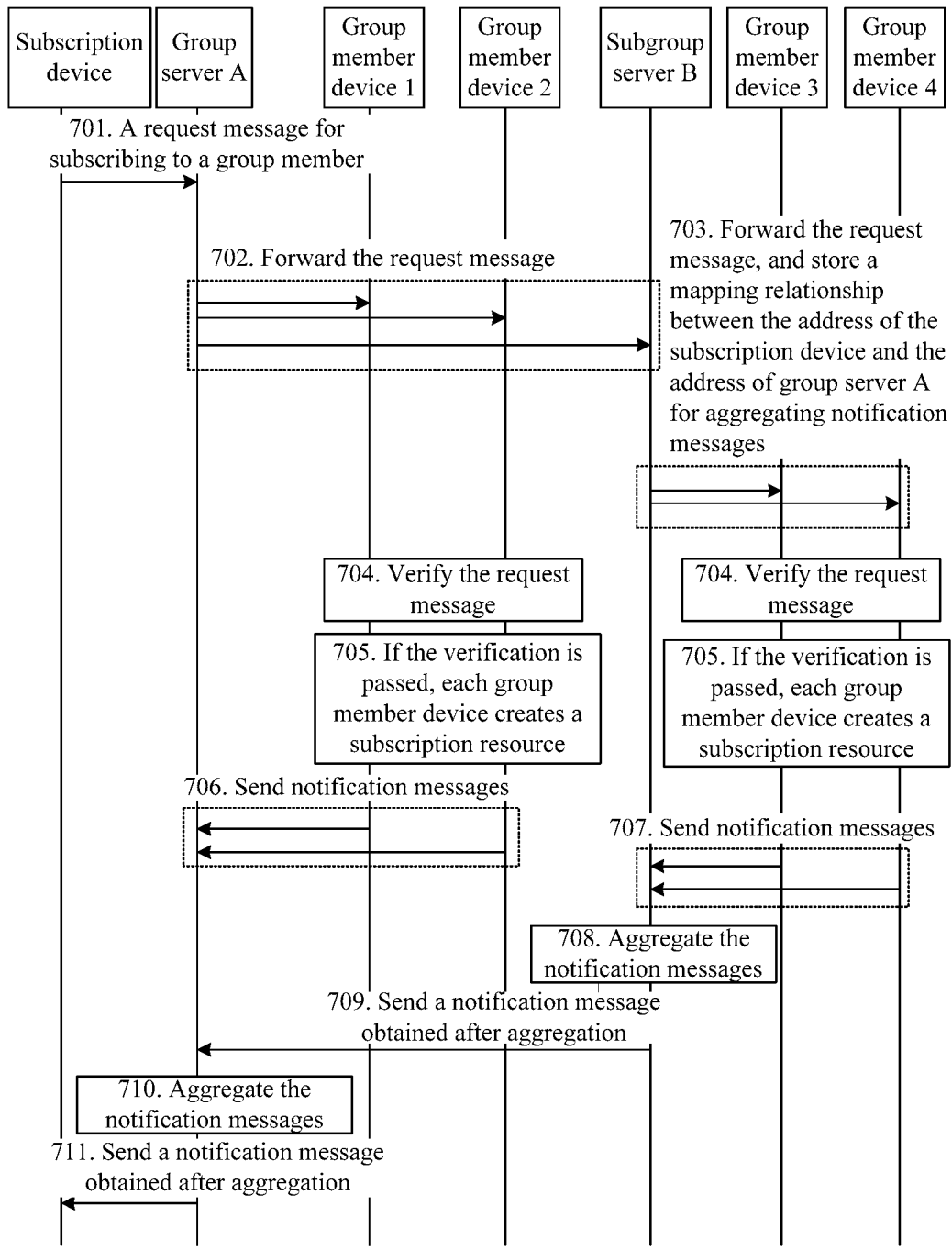
FIG. 8 is a schematic flowchart of another embodiment of a group communication method according to the present invention.

FIG. 8 is a schematic flowchart of another embodiment of a group communication method according to the present invention. In this embodiment of the present invention, the solution of the present invention is described with an example where a group includes a subgroup. In this embodiment of the present invention, group A includes subgroup B, group member device 1, and group member device 2, and subgroup B includes group member device 3 and group member device 4. As shown in FIG. 8, the method includes:

Step 701: A subscription device sends a request message for subscribing to a group member resource to group server A, where the request message carries an address of the subscription device.

Step 702: Group server A forwards the request message for subscribing to a group member resource to each group member device that belongs to group server A and to subgroup server B, where the request message carries an address of group server A for aggregating notification messages and the address of the subscription device.

Step 703: Subgroup server B forwards the request message for subscribing to a group member resource to each group member device that belongs to the group server, where the request message carries an address of subgroup server B for aggregating notification messages and the address of the subscription device; and stores a mapping relationship between the address of the subscription device and the address of group server A for aggregating notification messages.

Step 704: Each group member device verifies the request message according to the address of the subscription device carried in the request message.

Step 705: If the verification is passed, each group member device creates a subscription resource, and stores an address of the corresponding group server for aggregating notification messages and the address of the subscription device.

In this embodiment of the present invention, group member device 1 and group member device 2 store the address of group server A for aggregating notification messages and the address of the subscription device, where the addresses are carried in the request message by group server A; group member device 3 and group member device 4 store the address of subgroup server B for aggregating notification messages and the address of the subscription device, where the addresses are carried in the request message by subgroup server B.

Step 706: When resources of group member device 1 and group member device 2 of group server A meet a subscription condition set by the subscription device, group member device 1 and group member device 2 send notification messages to the address of group server A for aggregating notification messages, where the notification messages carry the address of the subscription device.

Step 707: When resources of group member device 3 and group member device 4 of subgroup server B meet the subscription condition set by the subscription device, group member device 3 and group member device 4 send notification messages to the address of subgroup server B for aggregating notification messages, where the notification messages carry the address of the subscription device.

Step 708: Subgroup server B aggregates the notification messages according to the address of the subscription device.

Step 709: Subgroup server B sends, according to the stored mapping relationship between the address of the subscription device and the address of group server A for aggregating notification messages, a notification message obtained after aggregation to the address of group server A for aggregating notification messages.

Step 710: Group server A aggregates the notification messages sent by group member device 1 and group member device 2, and the notification message that is obtained after aggregation and sent by subgroup server B.

Step 711: Group server A sends a notification message obtained after aggregation to the subscription device.

In this embodiment of the present invention, subgroup server B aggregates notification messages sent by group member devices that belong to subgroup server B, and sends a notification message obtained after aggregation to group server A. Group server A further aggregates notification messages sent by group member devices that belong to group server A, and the notification message that is obtained after aggregation and sent by subgroup server B. This reduces the number of notification messages between the subscription device and the group member devices, thereby reducing communication traffic.

Method Embodiment 8

Figure 9:
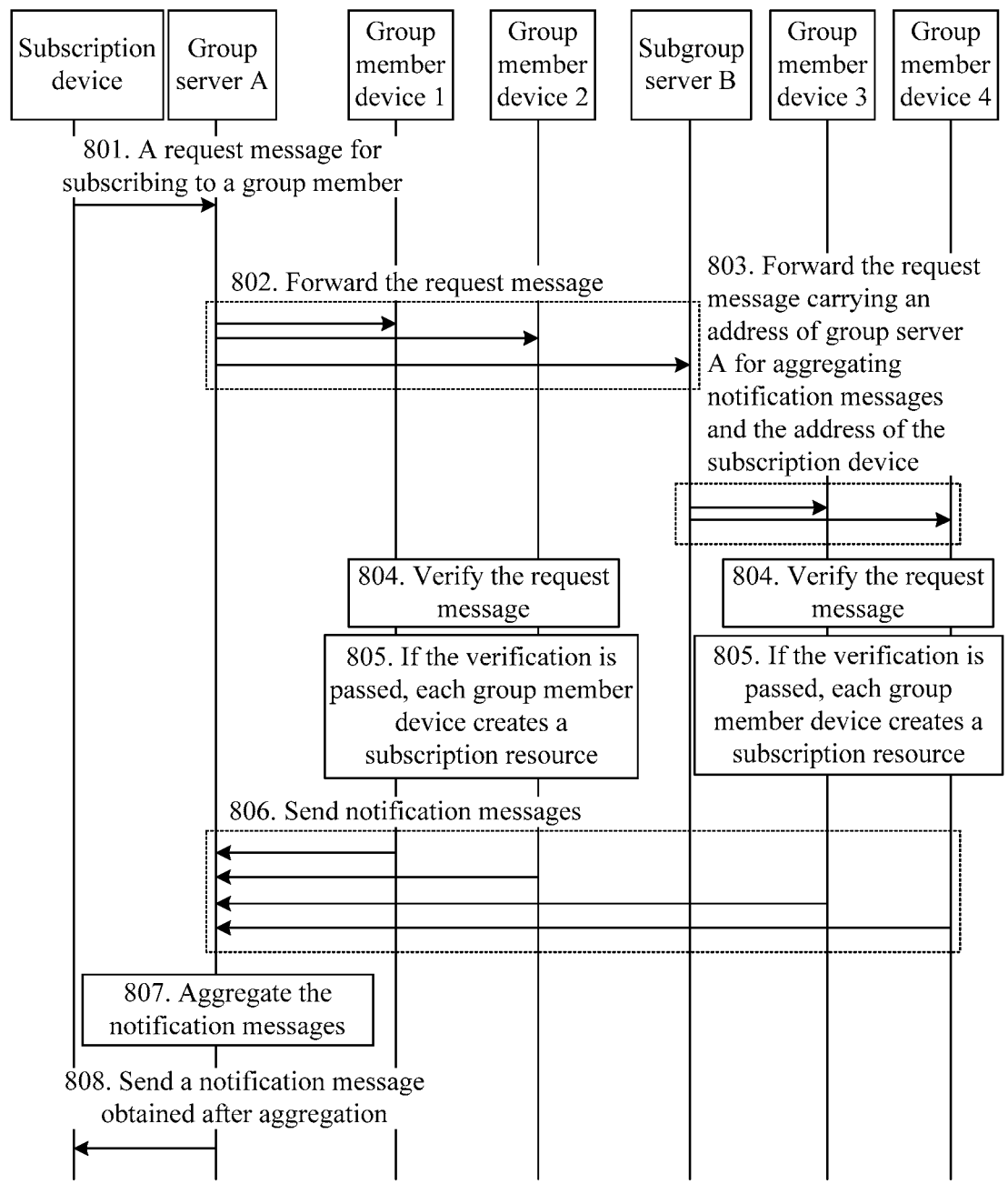
FIG. 9 is a schematic flowchart of another embodiment of a group communication method according to the present invention.

FIG. 9 is a schematic flowchart of another embodiment of a group communication method according to the present invention. In this embodiment of the present invention, the solution of the present invention is described with an example where a group includes a subgroup. In this embodiment of the present invention, group A includes subgroup B, group member device 1, and group member device 2, and subgroup B includes group member device 3 and group member device 4. As shown in FIG. 9, the method includes:

Step 801: A subscription device sends a request message for subscribing to a group member resource to group server A, where the request message carries an address of the subscription device.

Step 802: Group server A forwards the request message for subscribing to a group member resource to each group member device that belongs to group server A and to subgroup server B, where the request message carries an address of group server A for aggregating notification messages and the address of the subscription device.

Step 803: Subgroup server B forwards the request message for subscribing to a group member resource to each group member device that belongs to subgroup server B, where the request message carries an address of group server A for aggregating notification messages and the address of the subscription device.

Step 804: Each group member device verifies the request message according to the address of the subscription device carried in the request message.

Step 805: If the verification is passed, each group member device creates a subscription resource and stores the address of group server A for aggregating notification messages and the address of the subscription device.

Step 806: When resources of group member device 1, group member device 2, group member device 3, and group member device 4 meet a subscription condition set by the subscription device, they respectively send notification messages to group server A according to the address of group server A for aggregating notification messages, where the notification messages carry the address of the subscription device.

Step 807: Group server A aggregates the notification messages according to the address of the subscription device.

Step 808: Group server A sends a notification message obtained after aggregation to the subscription device.

In this embodiment of the present invention, group server A aggregates notification messages sent to the same subscription device by group member devices that belong to group server A, and notification messages sent to the same subscription device by group member devices that belong to subgroup server B. This reduces the number of notification messages between the subscription device and the group member devices, thereby reducing communication traffic.

The following describes the overall technical solution of an embodiment of a group server of the present invention.

Figure 10:
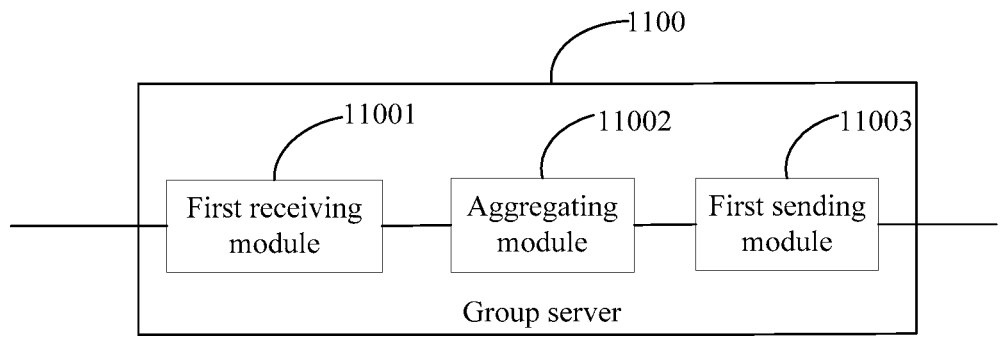
FIG. 10 is a schematic diagram of an embodiment of a group server according to the present invention.

FIG. 10 is a schematic structural diagram of an embodiment of a group server according to the present invention. As shown in FIG. 10, a group server 1100 includes a first receiving module 11001, an aggregating module 11002, and a first sending module 11003.

The first receiving module 11001 is configured to receive notification messages sent by a group member device, where the notification messages are sent to a group server after a resource of the group member device meets a subscription condition set by a subscription device, and the number of notification messages is two at least.

The aggregating module 11002 is configured to aggregate, according to an address of the subscription device, the notification messages destined for the same subscription device.

The first sending module 11003 is configured to send, according to the address of the subscription device, a notification message obtained after aggregation to the subscription device.

In this embodiment of the present invention, a group server receives notification messages sent by a group member device, aggregates, according to an address of a subscription device, the notification messages destined for the same subscription device, and sends a notification message obtained after aggregation to the subscription device. By aggregating multiple messages sent by the group member device to the subscription device, messages exchanged between the group member device and the subscription device are reduced, thereby reducing communication traffic between the group member device and the subscription device.

Alternatively, in this embodiment of the present invention, the aggregating module 11002 may be specifically configured to aggregate, according to a forwarding identifier and the address of the subscription device carried in the notification messages, the notification messages destined for the same subscription device. In addition, the aggregating module 11002 may be specifically configured to aggregate, according to a recipient address of the notification messages and the address of the subscription device carried in the notification messages, the notification messages destined for the same subscription device. In addition, the aggregating module 11002 may be specifically configured to aggregate, according to a recipient address of the notification messages and the address of the subscription device stored in a subresource of the group server, the notification messages destined for the same subscription device.

Alternatively, in this embodiment of the present invention, the first receiving module 11001 may be further configured to receive an address change request message sent by the subscription device, where the address change request message carries the changed address of the subscription device, and update the address of the subscription device stored in the subresource to the changed address.

The following describes the overall technical solution of an embodiment of a group member device of the present invention.

Figure 11:
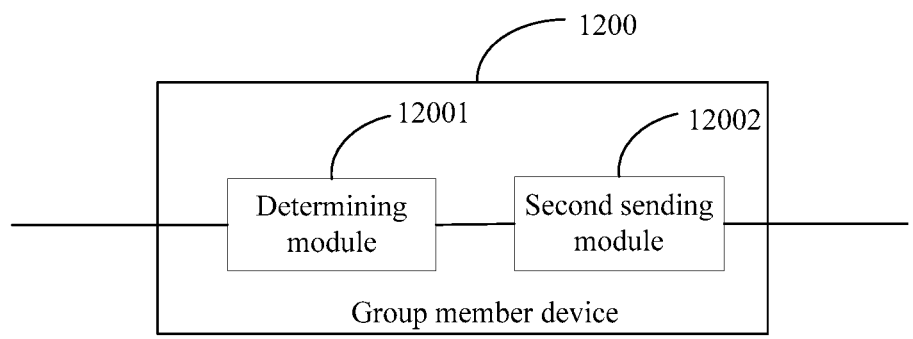
FIG. 11 is a schematic diagram of an embodiment of a group member device according to the present invention.

FIG. 11 is a schematic structural diagram of an embodiment of a group member device according to the present invention. As shown in FIG. 11, a group member device 1200 includes a determining module 12001 and a second sending module 12002.

The determining module 12001 is configured to determine whether a resource of the group member device meets a set subscription condition.

The second sending module 12002 is configured to send notification messages to a group server if the resource of the group member device meets the set subscription condition, so that the group server aggregates the notification messages and sends a notification message obtained after aggregation to a subscription device.

In this embodiment of the present invention, after a resource of a group member device meets a set subscription condition, the group member device sends notification messages to a group server, so that the group server aggregates the notification messages and sends a notification message obtained after aggregation to the subscription device. By aggregating multiple messages sent by the group member device to the subscription device, messages exchanged between the group member device and the subscription device are reduced, thereby reducing communication traffic between the group member device and the subscription device.

Alternatively, in this embodiment of the present invention, the second sending module 12002 is specifically configured to: send notification messages to the group server, where the notification messages carry a forwarding identifier and an address of the subscription device, so that the group server aggregates the notification messages according to the forwarding identifier and the address of the subscription device and sends a notification message obtained after aggregation to the subscription device; or send notification messages to the group server, where the notification messages carry an address of the subscription device, and a recipient address of the notification messages is an address of a subresource of the group server for aggregating notification messages, so that the group server aggregates the notification messages according to the address of the subresource and the address of the subscription device and sends a notification message obtained after aggregation to the subscription device; or send notification messages to the group server, where a recipient address of the notification messages is an address of a subresource of the group server for aggregating notification messages, so that the group server acquires, according to the address of the subresource, an address of the subscription device stored in the subresource, aggregates the notification messages according to the address of the subscription device, and sends a notification message obtained after aggregation to the subscription device.

The following describes the overall technical solution of an embodiment of a group communication system of the present invention.

Figure 12:
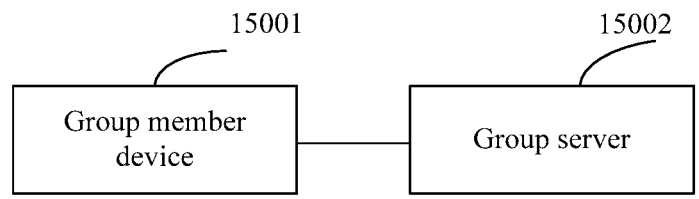
FIG. 12 is a schematic diagram of an embodiment of a group communication system according to the present invention.

FIG. 12 is a schematic structural diagram of an embodiment of a group communication system according to the present invention. As shown in FIG. 12, the group communication system includes a group member device 15001 and a group server 15002.

The group member device 15001 is configured to send notification messages to the group server 15002, where the notification messages are sent to the group server 15002 after a resource of the group member device 15001 meets a subscription condition set by a subscription device, and the number of notification messages is two at least.

The group server 15002 is configured to receive the notification messages sent by the group member device 15001, aggregate, according to an address of the subscription device, the notification messages destined for the same subscription device, and send, according to the address of the subscription device, a notification message obtained after aggregation to the subscription device.

In this embodiment of the present invention, after a resource of a group member device meets a set subscription condition, the group member device sends notification messages to a group server. The group server receives the notification messages sent by the group member device, aggregates, according to an address of a subscription device, the notification messages destined for the same subscription device, and sends a notification message obtained after aggregation to the subscription device. By aggregating multiple messages sent by the group member device to the subscription device, messages exchanged between the group member device and the subscription device are reduced, thereby reducing communication traffic between the group member device and the subscription device.

A person of ordinary skill in the art may be aware that, in combination with the examples described in the embodiments disclosed in this specification, modules, units, and steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, module, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or modules may be combined or integrated into another system, or some features may be ignored or not performed. In addition, the displayed or discussed inter-coupling, or direct coupling, or communication connections may be indirect coupling or communication connections through some interfaces, apparatuses, modules, or units, and may be electric, mechanical or other forms of connections.

The modules or units described as separate parts may or may not be physically separate, and parts displayed as modules or units may or may not be physical modules or units, may be located in one position, or may be distributed on a plurality of network modules or units. A part or all of the modules or units may be selected according to actual needs to achieve the objectives of the solutions of the embodiments.

In addition, functional modules or units in the embodiments of the present invention may be integrated into one processing module or unit, or each of the modules or units may exist alone physically, or two or more modules or units are integrated into one module or unit. The integrated modules or units may be implemented in a form of hardware, or may be implemented in a form of a software functional unit.

When the integrated modules or units are implemented in the form of a software functional module or unit and sold or used as an independent product, the integrated modules or units may be stored in a computer-readable storage medium. According to such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disc, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A group communication method, comprising:
   receiving, by a group member device, a request message for subscribing a group member resource of the group member device sent by a group server, wherein the request message comprises an address of the group server and an address of a subscription device;
   determining, by the group member device, that a resource of the group member device meets a subscription condition and based thereon:
   sending, by the group member device, a notification message to the group server based on the address of the group server, wherein the notification message comprises the address of the subscription device and a forwarding identifier, the forwarding identifier is used to trigger the group server to aggregate the notification message sent by the group member device and a notification message sent by another group member device according to the address of the subscription device.

2. The method according to claim 1, after receiving the request message sent by the group server, the method further comprising:
   determining, by the group member device, whether the subscription device has service subscription permission for the group member device.

3. The method according to claim 2, further comprising:
   creating, by the group member device, subscription resource after determined that the subscription device has service subscription permission for the group member device, wherein the subscription resource comprises a recipient address of a notification message of the subscription resource, and the recipient address is the address of the group server.

4. The method according to claim 1, wherein sending, by the group member device, a notification message to the group server based on the address of the group server comprises:
   sending, by the group member device, a notification message to the group server, wherein the notification message comprises the address of the subscription device, and a recipient address, wherein the recipient address comprises an address of a subresource of the group server.

5. The method according to claim 4, before the group member device determines that the resource of the group member device meets the subscription condition, the method further comprising:
   receiving, by the group member device, a resource subscription request message sent by the group server, wherein the request message comprises the address of the subresource of the group server; and
   setting, by the group member device, the address of the subresource to the recipient address of the notification messages.

6. A group member device, comprising:
   a non-transitory memory storage comprising instructions; and
   one or more processors in communication with the memory, wherein the one or more processors execute the instructions to:
   receive a request message for subscribing a group member resource sent by a group server, wherein the request message carries an address of the group server and an address of a subscription device;
   determine that a resource of the group member device meets a subscription condition; and
   based thereon:
   send a notification messages to the group server based on the address of the group server, wherein the notification message comprises the address of the subscription device and a forwarding identifier, the forwarding identifier is used to trigger the group server to aggregate the notification message sent by the group member device and a notification message sent by another group member device according to the address of the subscription device.

7. The group member device according to claim 6, wherein the processors further execute the instructions to determine whether the subscription device has service subscription permission for the group member device.

8. The group member device according to claim 6, wherein the processors further execute the instructions to create subscription resource after determined that the subscription device has service subscription permission for the group member device, wherein the subscription resource comprises a recipient address of a notification message of the subscription resource, and the recipient address is the address of the group server.

9. The group member device according to claim 6, wherein the processors further execute the instructions to:
   send a notification message to the group server, wherein of the notification message comprises the address of the subscription device and a recipient address, wherein the recipient address comprises an address of a subresource of the group server.

10. A group communication system, comprising:
    a group member device having a first processor, configured to receive a request message for subscribing a group member resource sent by a group server, wherein the request message comprises an address of the group server and an address of a subscription device, determine that a resource of the group member device meets a subscription condition and send a notification message to the group server based on the address of the group server, wherein the notification message comprises the address of the subscription device and a forwarding identifier, the forwarding identifier is used to trigger the group server to aggregate the notification message sent by the group member device and a notification message sent by another group member device according to the address of the subscription device;

a group server having a second processor, configured to send a request message for subscribing a group member resource to the group member device, wherein the request message comprises the address of the group server and the address of the subscription device; and aggregate notification messages sent by the group member device according to the forwarding identifier, and send the aggregated notification messages to the subscription device according to the address of the subscription device.

11. The group communication system according to claim 10, wherein, the second processor in the group server further configured to receive a plurality of notification messages each notification message sent by a respective group member device, and each of the notification messages comprises the address of the subscription device and the forwarding identifier.

12. The group communication system according to claim 10, wherein, aggregate notification messages sent by the group member device according to the forwarding identifier, and send the aggregated notification messages to the subscription device according to the address of the subscription device comprises:

selecting, by the group server, a plurality of the notification messages that each carry a same forwarding identifier;

aggregating, by the group server, the selected messages into one or more single notification messages according to the address of the subscription device in the messages.

13. A group communication method, comprising:

receiving, by a group server, a subscription request message sent by a subscription device for subscribing a group member resource of the group server, wherein the request message carries a forwarding identifier which is used to indicate the group server to aggregate notification messages sent by a group member device and a notification message sent by another group member device;

adding, by the group server, a group server address into the subscription request message; and determining that a resource change of the group member device meets a subscription condition of the subscription device and based thereon:

sending, by the group server, the subscription request message with the group server address to each group member device, wherein the group server address is used to indicate the group member device sending notification message to the group server.

14. The group communication method according to claim 13, further comprising:

receiving, by the group server, a plurality of notification messages, wherein each notification message is sent by a respective group member device, and each notification message comprises the address of the subscription device and the forwarding identifier;

selecting, by the group server, a plurality of the notification messages that each carry a same forwarding identifier;

aggregating, by the group server, the selected messages into one or more aggregated notification messages according to the address of the subscription device in the messages; and sending, by the group server, each of the aggregated notification messages to the address of the subscription device associated with the aggregated notification message.

* * * * *

UNITED STATES PATENT AND TRADEMARK OFFICE
CERTIFICATE OF CORRECTION

PATENT NO. : 10,638,362 B2
APPLICATION NO. : 15/876562
DATED : April 28, 2020
INVENTOR(S) : Fangying Xiao and Yongjing Zhang Page 1 of 1

It is certified that error appears in the above-identified patent and that said Letters Patent is hereby corrected as shown below:

In the Claims

In Column 22, Line 59, in Claim 9, delete "of the" and insert -- the --, therefor.

Signed and Sealed this
Fourteenth Day of July, 2020

Andrei Iancu
*Director of the United States Patent and Trademark Office*